UNITED STATES PATENT OFFICE.

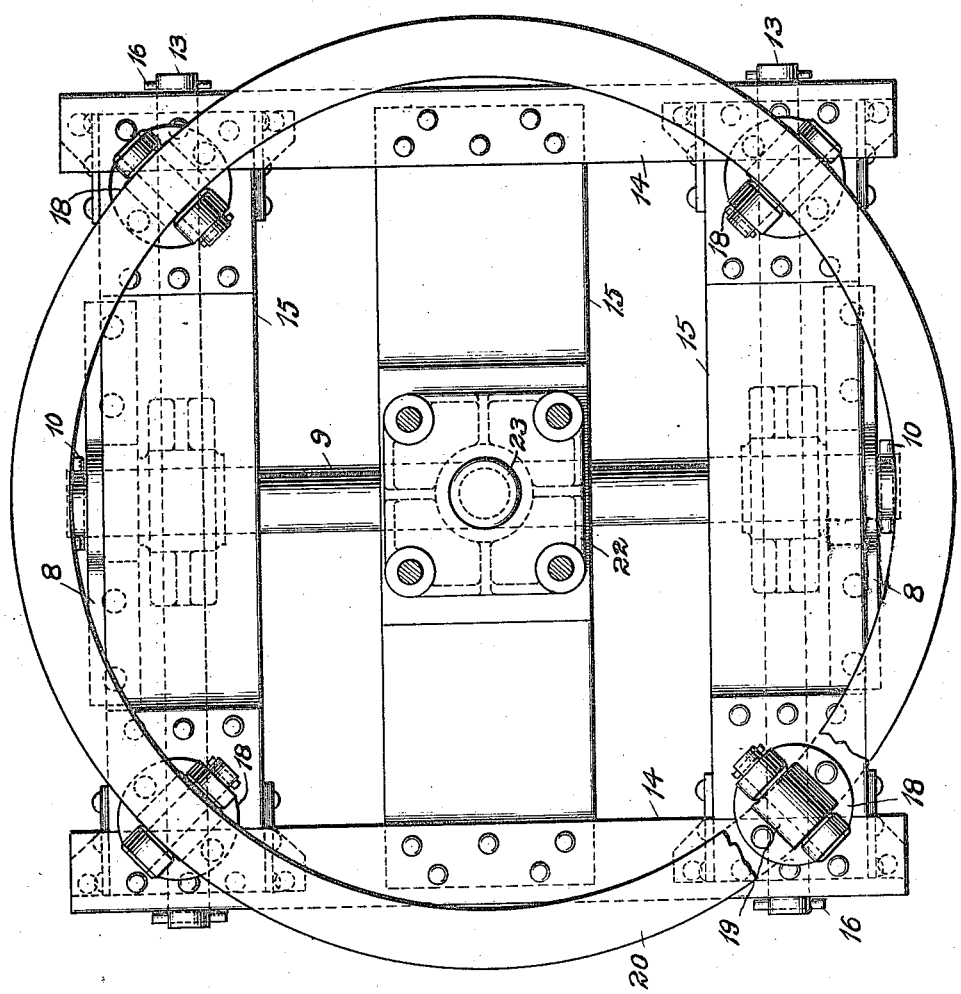

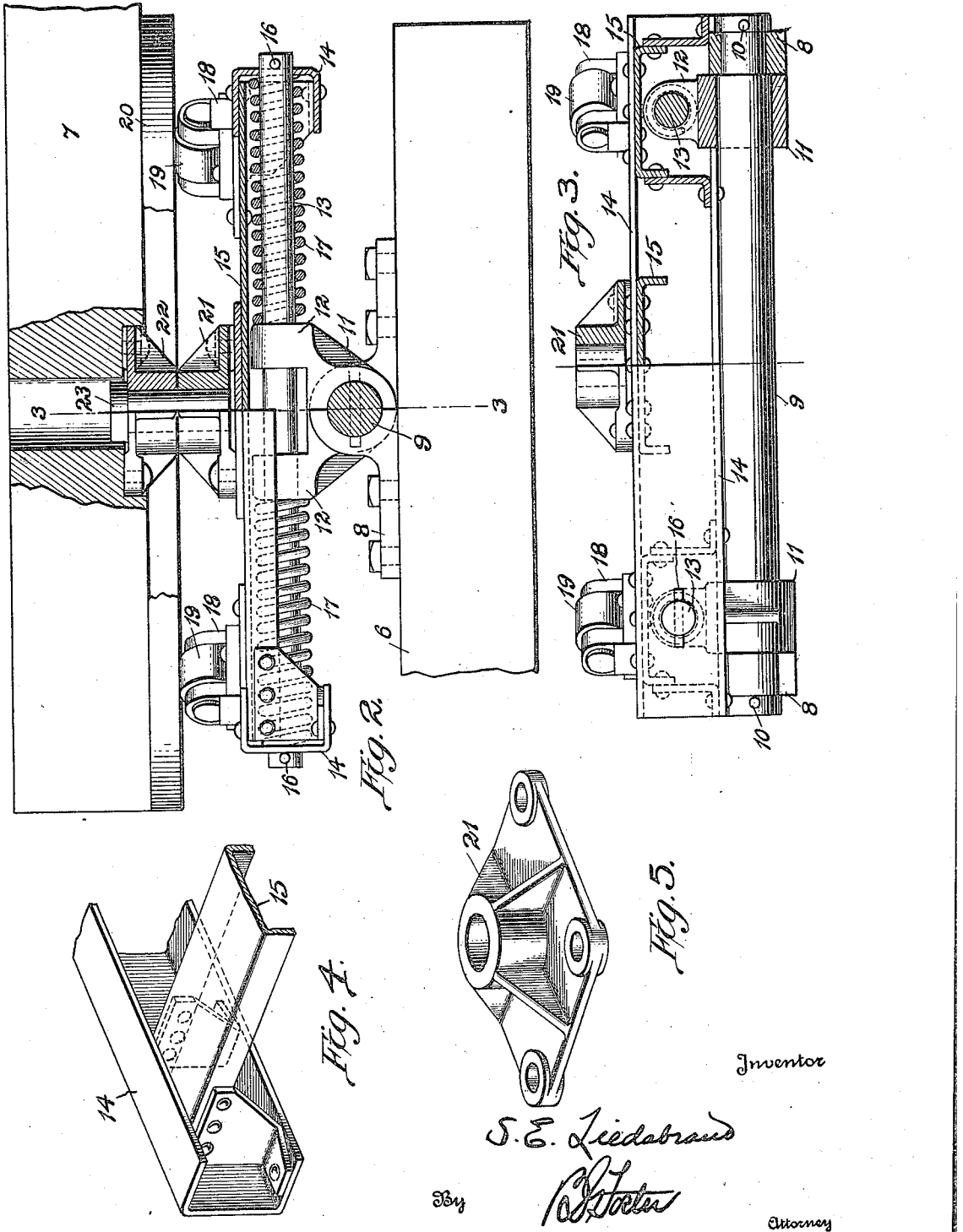

SAMUEL E. LIEDABRAND, OF SPRINGFIELD, ILLINOIS.

TRAILER CONNECTION.

1,424,496.    Specification of Letters Patent.    Patented Aug. 1, 1922.

Application filed June 21, 1920. Serial No. 390,468.

*To all whom it may concern:*

Be it known that I, SAMUEL E. LIEDA-BRAND, a citizen of the United States, residing at Springfield, in the county of Sangamon and State of Illinois, have invented certain new and useful Improvements in Trailer Connections, of which the following is a specification.

The present invention relates to means for connecting a trailer member to a truck-tractor or similar vehicle, and the primary object is to provide a new and practicable structure that will permit relative play between the two vehicles, and also absorb the shocks of starting and stopping.

The preferred embodiment of the invention is illustrated in the accompanying drawings, wherein:—

Figure 1 is a plan view of the mechanism,

Figure 2 is a vertical sectional view therethrough,

Figure 3 is a sectional view on the line 3—3 of Figure 2,

Figure 4 is a detail perspective view of a corner portion of the lower turntable member, Figure 5 is a perspective view of one of the king pin trunnions.

In the embodiment illustrated, a portion of a tractor or truck chassis is illustrated at 6, and a portion of the chassis of a semi-trailer is shown at 7. Supported on the part 6 are spaced journal boxes 8 carrying a pivot member in the form of a shaft 9 that is pinned, as shown at 10, to prevent its longitudinal displacement. The shaft has brackets 11 journaled thereon, just inside the boxes 8, these brackets having upstanding collars 12 in which are slidably mounted the intermediate portions of spring carriers in the form of rods 13.

A lower turntable member is supported by the rods 13, said member consisting of end U-bars 14 connected by channel bars 15 forming a rectangular frame. The ends of the rods 13 pass through the bars 14 and are pinned, as shown at 16. Coiled springs 17 are interposed between the ears 12 of the brackets 11 and the end bars 14, these springs serving to center the lower turntable member, and yet permit its longitudinal movement in either direction under strain. Mounted on the corners of the lower turntable member are brackets 18 in which are journaled rollers 19 that support a circular track 20 fastened to the underside of the chassis 7, and constituting a part of an upper turntable member. A central upstanding trunnion 21 is fixed to the central cross bar of the lower turntable member, and a depending trunnion 22 is mounted on the under side of the chassis 7, the two being aligned and adapted to receive a king pin, as 23.

With this structure, it will be evident that the connection between the tractor and the trailer member will permit their relative movements in various directions so as to accommodate the same without placing undue strain and wear upon the parts. Moreover in starting and stopping the parts will yield, thereby absorbing shocks and jars and avoiding transmission of the same to the driving mechanism of the tractor.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In mechanism of the character set forth, the combination with a lower pivot member, of mounting means therefor, an angular tiltable lower turntable member carried by the pivot member, rollers journaled on the corner portions of the lower member, and an upper turntable member journaled on the lower member and having a track portion that rides on the rollers.

2. In mechanism of the character set forth, the combination with a lower pivot shaft, of means for mounting the same on the rear portion of a truck, spaced brackets on the pivot shaft, an angular lower turntable member including transverse bars substantially parallel to the shaft, spaced slide rods connected to the transverse bars of the lower turntable member and slidable in the brackets, coiled springs on the rods between the brackets and lower turntable member, rollers on the corners of said transverse bars of the lower turntable member, an upper turntable member journaled on the lower turntable member and having a trackway operating on the rollers, and means for securing a trailer to the upper turntable member.

In testimony whereof, I affix my signature in the presence of two witnesses.

SAMUEL E. LIEDABRAND.

Witnesses:
G. W. SOLOMON,
D. M. WALSH.